(12) United States Patent
Seda et al.

(10) Patent No.: US 11,732,320 B2
(45) Date of Patent: Aug. 22, 2023

(54) HIGH STRENGTH STEEL WITH IMPROVED MECHANICAL PROPERTIES

(71) Applicant: TATA STEEL IJMUIDEN B.V., Velsen-Noord (NL)

(72) Inventors: Petra Seda, Zandvoort (NL); Stefanus Matheus Cornelis Van Bohemen, Leiden (NL)

(73) Assignee: TATA STEEL IJMUIDEN B.V., Velsen-Noord (NL)

(*) Notice: Subject to any disclaimer, the term of this patent is extended or adjusted under 35 U.S.C. 154(b) by 0 days.

(21) Appl. No.: 17/418,558

(22) PCT Filed: Feb. 11, 2020

(86) PCT No.: PCT/EP2020/053448
§ 371 (c)(1),
(2) Date: Jun. 25, 2021

(87) PCT Pub. No.: WO2020/169410
PCT Pub. Date: Aug. 27, 2020

(65) Prior Publication Data
US 2022/0074014 A1   Mar. 10, 2022

(30) Foreign Application Priority Data
Feb. 18, 2019 (EP) .................................... 19157858

(51) Int. Cl.
| | | |
|---|---|---|
| *B32B 15/01* | (2006.01) | |
| *C21D 1/18* | (2006.01) | |
| *C22C 38/00* | (2006.01) | |
| *C22C 38/02* | (2006.01) | |
| *C22C 38/06* | (2006.01) | |
| *C22C 38/22* | (2006.01) | |
| *C22C 38/24* | (2006.01) | |
| *C22C 38/26* | (2006.01) | |
| *C22C 38/28* | (2006.01) | |
| *C22C 38/32* | (2006.01) | |
| *C22C 38/38* | (2006.01) | |
| *C23C 2/06* | (2006.01) | |
| *C23C 2/28* | (2006.01) | |
| *C23C 2/40* | (2006.01) | |
| *C21D 9/46* | (2006.01) | |
| *C21D 6/00* | (2006.01) | |
| *C21D 8/04* | (2006.01) | |

(52) U.S. Cl.
CPC ............ *C21D 9/46* (2013.01); *B32B 15/013* (2013.01); *C21D 1/18* (2013.01); *C21D 6/002* (2013.01); *C21D 6/005* (2013.01); *C21D 6/008* (2013.01); *C21D 8/0405* (2013.01); *C21D 8/0426* (2013.01); *C21D 8/0436* (2013.01); *C22C 38/001* (2013.01); *C22C 38/002* (2013.01); *C22C 38/02* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C23C 2/06* (2013.01); *C23C 2/28* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
CPC ... B32B 15/013; C22C 38/001; C22C 38/002; C22C 38/02; C22C 38/06; C22C 38/22; C22C 38/24; C22C 38/26; C22C 38/28; C22C 38/32; C22C 38/38; C21D 2211/001; C21D 2211/002; C21D 2211/005; C21D 2211/008; C23C 2/06; C23C 2/28; C23C 2/40
USPC .................................................. 428/659
See application file for complete search history.

(56) References Cited

U.S. PATENT DOCUMENTS

| | | | |
|---|---|---|---|
| 4,812,371 A | 3/1989 | Shindou et al. | |
| 2017/0037496 A1* | 2/2017 | Kajihara | .................. C21D 9/46 |
| 2017/0191150 A1* | 7/2017 | Hanlon | .................. C22C 18/02 |
| 2019/0352750 A1* | 11/2019 | Arman | .................... C22C 38/06 |

FOREIGN PATENT DOCUMENTS

| | | |
|---|---|---|
| CN | 104245971 A | 12/2014 |
| CN | 106119698 A | 11/2016 |
| CN | 106232852 A | 12/2016 |
| CN | 107002206 A | 8/2017 |
| CN | 108463340 A | 8/2018 |
| CN | 108474057 A | 8/2018 |
| EP | 2831299 A1 | 2/2015 |
| JP | 2010248601 A | 11/2010 |
| WO | 2013007729 A1 | 1/2013 |

(Continued)

OTHER PUBLICATIONS

Instron, "Proportional Limit", Printed on Oct. 14, 2022, URL: <https://www.instron.com/en-us/resources/glossary/p/proportional-limit>, entire document (Year: 2022).*
Office Action issued by China National Intellectual Property Administration dated Dec. 22, 2022 in Application No. 202080009298.6, filed Feb. 11, 2020, 12 pages.
International Search Report and Written Opinion dated Apr. 17, 2020 for PCT/EP2020/053448 to Tata Steel Ijmuiden B.V. filed Feb. 11, 2020.

*Primary Examiner* — Humera N. Sheikh
*Assistant Examiner* — Katherine A Christy
(74) *Attorney, Agent, or Firm* — Vorys, Sater, Seymour and Pease LLP

(57) ABSTRACT

A high strength steel strip having medium amounts of C, Mn, Si, Cr and Al, wherein the steel strip has a microstructure consisting of, in vol. %: ferrite and bainite together 50-90%, martensite<15%, retained austenite 5-15%, the remainder being pearlite, cementite, precipitates and inclusions together up to 5%.

27 Claims, No Drawings

(56) References Cited

FOREIGN PATENT DOCUMENTS

| | | |
|---|---|---|
| WO | 2013144376 A1 | 10/2013 |
| WO | 2013144377 A1 | 10/2013 |
| WO | 2014139625 A1 | 9/2014 |
| WO | 2015158731 A1 | 10/2015 |
| WO | 2016005061 A1 | 1/2016 |
| WO | 2017102982 A1 | 6/2017 |
| WO | 2017108251 A | 6/2017 |
| WO | 2017108866 A1 | 6/2017 |
| WO | WO-2017102982 A1 * | 6/2017 ........... B32B 15/013 |
| WO | 2017125773 A1 | 7/2017 |
| WO | 2018055098 A1 | 3/2018 |
| WO | 2018096090 A1 | 5/2018 |

* cited by examiner

HIGH STRENGTH STEEL WITH IMPROVED MECHANICAL PROPERTIES

CROSS-REFERENCE TO RELATED APPLICATIONS

This is a § 371 National Stage Application of International Application No. PCT/EP2020/053448 filed on Feb. 11, 2020, claiming the priority of European Patent Application No. 19157858.2 filed on Feb. 18, 2019.

The invention relates to a high strength steel with improved mechanical properties. The invention also relates to a method with which such a high strength steel can be produced.

Enhancement of ductility at elevated strength is desirable for widespread markets. In the automotive industry in particular, where legislation is driving improvements in fuel economy and safety, there is a move towards stronger, formable high strength steels. High strength and ultrahigh strength strip steel provides automotive manufacturers potential for down weighting of the body in white and the opportunity for countering weight increases arising from the move to electric and hybrid vehicles. In addition high and ultrahigh strength steels play a critical role in determining the crash worthiness of modern passenger vehicles.

Extensive application of high strength and ultrahigh strength steel requires, in many cases, levels of formability that are higher than can be expected for conventional carbon-manganese steels. Enhancement of residual ductility in formed parts is beneficial for integrity in crash. Several high strength steel types have been developed in the last years whereby as a first approximation tensile elongation was considered to be a simple measure of both formability and impact integrity. However, recent developments of advanced high strength steels (AHSS) have shown that edge ductility plays an equally important role.

With increasing strength the tensile elongation and/or the edge ductility (measured as hole expansion ration) are lower. Usually, elongation and edge ductility are conflicting properties: when elongation is improved, the edge ductility is lower, and vice versa. The optimal formability of AHSS sheet thus is a compromise between elongation and edge ductility. This has repercussions for the forming of a complex automotive part from a AHSS sheet in a press, but also for the deformability of the part in a crash.

In the development of high strength steel sheets it has been tried to overcome these issues by using higher amounts of alloying elements in the steel. Extreme enhancement of formability may also be achieved by utilising high alloy (predominantly manganese) additions to stabilise austenite. Examples are medium manganese steels and Twinning Induced Plasticity (TWIP) steels. Austenite is inherently more ductile than ferrite and twinning can provide a very effective work hardening mechanism. Such steels may achieve very high elongations (typically 30-50%) at very high strengths (typically 1000 MPa). However, the yield strength is comparatively low and large strains need to be uniformly imposed to achieve high strength in the formed component. Furthermore, the extremely high levels of alloy make large scale production over conventional process problematic.

It is an object of the invention to provide a high strength steel type with optimized properties in view of tensile elongation and hole expansion ratio.

It is a further object of the invention to provide a high strength steel type having a low yield strength.

It is another object of the invention to provide a high strength steel type having a relatively low amount of alloying elements.

One or more of these objects are achieved according to the invention by providing a high strength steel strip consisting of the following elements, in wt. %: C: 0.12-0.18, Mn: 2.00-2.60, Si: 0.30-0.77, Cr: 0.10-0.70, Al: <0.39, S: <0.005, N: <0.015, P: <0.03 and optionally one or more of the elements selected from: Nb: <0.06, Mo: <0.20, Ti: <0.04, V: <0.20, B: <0.004, Ca: <0.004, the remainder being iron and unavoidable impurities, wherein the steel strip has a microstructure consisting of, in vol. %: ferrite and bainite together 50-90, martensite<15, retained austenite 5-15, the remainder being pearlite, cementite, precipitates and inclusions together up to 5, the sum adding up to 100 vol. %.

The inventors have found that balanced properties of a dual phase steel with high strength are realized by choosing a suitable alloying strategy and by adjusting the microstructural features during processing.

The invention focuses on a dual phase steel with optimized properties for formability. To get a high hole expansion ratio (HEC value), the microstructure has to contain a high amount of bainite. Using Si as an alloying element, a carbon-free bainite is formed, wherein the excessive carbon diffuses into austenite and stabilizes it. Retained austenite is present because it is good for elongation and thus improves the formability of the steel sheet during forming. Retained austenite is metastable and transforms into martensite during forming, which improves the strength of the formed part. However, a higher bainite fraction is not favourable for elongation, and retained austenite is not favourable for hole expansion. Therefore, a balanced microstructure with increased bainite fraction (good for HEC, not for elongation) and with retained austenite (good for elongation, not for HEC) has been designed for a dual phase steel with high strength and good formability. The amount of martensite is relatively low to provide high HEC values, and ferrite is present for lower yield strength.

Preferably, the microstructure of the steel according to the invention above consists of, in vol. %, one or more of the following: ferrite 15-55%, bainite 35-75%, martensite<10% (preferably 1-5%), retained austenite 5-10%, the remainder being pearlite, cementite, precipitates and inclusions together up to 5%, the sum adding up to 100 vol. %. This results in optimised formability of the steel.

Ferrite (15-55%): Ferrite is needed for providing a formable and work hardenable substrate and it is important for achieving the dual phase character and lower yield ratio. Above this limit the final microstructure will not contain enough bainite and/or martensite, and thus strength will be too low. Edge ductility will be not sufficient. Below this limit yield ratio will be too high.

Bainite (35-75%): Bainite provides strength. The transformation of bainite in the presence of silicon drives the carbon to the austenite phase, enabling levels of carbon enrichment in the austenite phase allowing formation of a (meta)stable phase at ambient temperature; this process is called partitioning. Bainite has also advantage over martensite as a strengthening phase because of less micro-scale localisation of strain and consequently improve resistance to fracture, i.e. it improves edge ductility. Below the lower limit there will be insufficient austenite stabilization and the edge ductility will be too low. Beyond the upper limit the yield strength will be too high.

Martensite (<15%): Martensite is formed during the final quench of the annealing. It also provides strength. Above the upper limit strength will be too high and/or edge ductility too low. Some martensite is preferably present for achieving DP tensile response (for suppressing yield point elongation). Preferably martensite is <10%, more preferably between 1 and 5%.

Retained austenite (5-15): Retained austenite enhances elongation through the TRIP effect. Below 5% the desired level of elongation will not be achieved. The upper limit is set by the composition. Preferably the upper limit is 10%.

Due to the processing of the steel strip small amounts of pearlite, cementite, precipitates and inclusions can be present in the steel, together up to 5%.

Moreover, the steel according to the invention combines a relatively low amount of carbon (0.12-0.18 wt. %) with relatively low amount of silicon (0.30-0.77 wt. %). This is advantageous for the production of the steel sheet in comparison with steel types containing higher amounts of carbon and/or silicon.

The alloying strategy is discussed below.

Carbon (0.12-0.18): Carbon (C) is needed to obtain the desired hardenability and strength level. It enables the stabilisation of retained austenite. Below this range the level of free carbon may be insufficient to enable stabilisation of the desired fraction of austenite. As a result the desired level of elongation may not be achieved. Above this range weldability becomes a concern.

Manganese (2.00-2.60): Manganese (Mn) delivers substantial solid solution strengthening, stabilises austenite, and enhances hardenability promoting the formation of hard transformation products at cooling rates achievable in conventional annealing lines. Above this range, the wettability of a steel strip surface is impaired. This maximum level is also given in view of the stronger segregations during casting and the forming of a band of martensite in the strip at higher values. At a Mn content below the lower limit, strength and transformation behaviour are deteriorated.

Silicon (0.30-0.77): Silicon (Si) addition provides solid solution strengthening thus enabling the attainment of high strength and promotes the stabilisation of austenite. Si very effectively retards the formation of carbides during overaging thus keeping carbon in solution for stabilisation of austenite. Ferrite and hard phases such as bainite and martensite exhibit improved ductility in the absence of carbides. Free carbon, not trapped in carbides, may be partitioned to austenite. For acceptable coatability the imposed addition of Si should be below the maximum level of 0.77 wt. %. Si is a ferrite stabilizing element and thereby ensures appropriate transformation behaviour to make a steel product with a relatively low yield strength. Segregation of Si during casting is less detrimental for edge ductility compared to Mn.

Chromium (0.10-0.70): Chromium (Cr) may be used to increase hardenability thus retarding the formation of high temperature transformation products on cooling to the overage temperature. Additions of Cr may therefore allow the utilisation of lower cooling rates more readily achieved in full-scale production lines. Because of its hardenability effect Cr is also effective in increasing the strength. At a Cr content below the lower limit the transformation behaviour is inadequate to deliver the desired strength level. A maximum level is imposed to ensure that not too much martensite and that enough bainite forms.

Aluminium (<0.39): Aluminium (Al) is used for deoxidising the liquid steel before casting. Furthermore, a small amount of Al can be used to adjust the transformation temperatures and kinetics during the cooling arrest. High levels of Al may lead to elevation of the ferrite to austenite transformation temperature range to levels that are not compatible with conventional installations. Thus, the total amount of aluminium in the steel in the form of Al-oxides and solute aluminium must be below 0.39 wt. %.

Sulphur (S<0.005): Sulphur (S) is preferably avoided but it is inevitably present in the steel making process. A lower sulphur content is better for edge ductility and formability in general.

Nitrogen (N<0.015): The content of nitrogen (N) is limited to max. 0.015 wt. % as is typical for continuous casting plants.

Phosphorus (P<0.03): Phosphorus can make the steel brittle upon welding, so the amount is limited to max. 0.03 wt. %.

Optionally, one or more of the following elements can be contained in the steel composition. Nb (<0.06), Mo (<0.20), Ti (<0.04) and V (<0.20). These elements can be used to refine microstructure in the hot rolled intermediate product and the finished product. The refined microstructure can lead to further improvement of edge ductility. These elements also provide a strengthening effect.

Boron (B<0.004): Boron (B) may be used to optimize transformation behaviour and strength. Boron suppresses ferrite formation during austenite cooling. Adding boron improves the hardenability of the steel.

Calcium (Ca<0.004): The addition of calcium (Ca) is beneficial mainly for steels with higher S contents. The addition of calcium modifies the morphology of manganese sulphide inclusions. When calcium is added the inclusions get a globular rather than an elongated shape. The avoidance of these elongated inclusions is beneficial for edge ductility. Ca treatment also prevents the formation of hard alumina inclusions.

According to a preferred embodiment, the amount of C is 0.13-0.18, preferably 0.14-0.17 (in wt. %), and/or the amount of Mn is 2.00-2.50, preferably 2.10-2.45, more preferably 2.15-2.40 (in wt. %).

The ranges for C and Mn, are chosen such that a correct balance is found to deliver appropriate transformation behaviour and strength level. Mn and C are austenite stabilizing elements, as elucidated above. The preferred ranges provide optimised strength and formability in combination with the other elements in the steel.

According to a further preferred embodiment, the amount of Si+Cr≤1.30, preferably Si+Cr≤1.20, more preferably Si+Cr≤1.10, still more preferably Si+Cr≤1.00, even more preferably Si+Cr≤0.90, most preferably Si+Cr≤0.84 (in wt. %).

Si and Cr are elements which stabilize ferrite. Ferrite formation is needed for a low yield strength product, however, too high ferrite fractions decreases the strength and/or edge ductility. Therefore, Si+Cr≤1.3 is a condition to ensure appropriate transformation behaviour, i.e. the right balance between phases (not too much ferrite is formed). Preferably the amount of Si+Cr is even lower to enhance the producibility of the steel sheet.

In that respect, it is preferred when the amount of Si is 0.30-0.70, more preferably 0.35-0.65, still more preferably 0.40-0.60 (in wt. %), and/or wherein the amount of Cr is 0.15-0.65, more preferably 0.20-0.60, still more preferably 0.25-0.60 (in wt. %), and/or wherein the amount of Al is <0.10, more preferably <0.05 (in wt. %). These preferred ranges provide optimal conditions for the formation of the right microstructure and good producibility of the steel.

Usually low amounts of optional elements are preferred in view of the cost of such elements. In that respect, the preferred amount of Nb is <0.04, preferably <0.03, more preferably <0.02 (in wt. %), the preferred amount of Ti is <0.03, more preferably <0.020, most preferably <0.01 (in wt. %), the preferred amount of B is <0.002, preferably <0.001, most preferably <0.0006 (in wt. %), the preferred amount of V is <0.10, preferably <0.05, most preferably <0.02 (in wt. %), and the preferred amount of Mo is <0.10, preferably <0.05, most preferably <0.02 (in wt. %).

It is also foreseen that one or more of Nb, Mo, Ti, V and B is present as an impurity, since there is no need to add such elements to reach the formability as desired in accordance with the invention.

According to a preferred embodiment of the invention the high strength steel strip has one or more of the following properties: a tensile strength ($R_m$) in the range of 950-1200 MPa, preferably 980-1180 MPa, a yield strength ($R_p$)≤620 MPa before temper rolling, preferably ≤600 MPa, a total elongation ($A_{JIS5}$)>12%, a hole expansion capacity (HEC) >15%.

These lower limits for elongation and hole expansion provide a very good formability of the steel during forming in a press, especially when combined.

Preferably the total elongation ($A_{JIS5}$) is >13%, more preferably >14%, most preferably >15%. Such high elongation levels for a high strength steel, especially for a steel with a tensile strength of at least 950 MPa, are exception in combination with a high HEC value and a low amount of alloying elements.

Preferably the hole expansion capacity (HEC) is >20%, more preferably >25%, most preferably >30%. Such high HEC values are very good for the formability of the steel.

The inventors have found that the high strength steel strip according to the invention has excellent formability when the mechanical properties as defined above fulfil the following condition: $(A_{JIS5} \times HEC \times R_m)/R_p \geq 550$, preferably $(A_{JIS5} \times HEC \times R_m)/R_p \geq 600$, more preferably $(A_{JIS5} \times HEC \times R_m)/R_p \geq 650$, most preferably $(A_{JIS5} \times HEC \times R_m)/R_p \geq 700$. The formula $(A_{JIS5} \times HEC \times R_m)/R_p$ effectively combines the most important mechanical properties such that the properties $A_{JIS5}$, HEC, and $R_m$ which should be high are combined with $R_p$ which should be low.

According to a preferred embodiment the high strength steel strip is coated with a zinc based coating, the coated strip having a yield strength $R_p \leq 740$ MPa after temper rolling, preferably $R_p \leq 720$ MPa after temper rolling, more preferably $R_p \leq 700$ MPa after temper rolling. Due to the coating with zinc in a hot dip coating bath, the yield strength of the steel becomes higher.

The invention according to a second aspect relates to a method of producing high strength steel strip according to the first aspect of the invention, comprising the following steps:

The steel with the composition according to the first aspect of the invention is cast and hot rolled to a strip having a thickness of 2.0-4.0 mm and coiled at a coiling temperature (CT) in the range 500-650° C.;

The strip is cold rolled with a reduction of 40-80%;

The strip is heated to a temperature T1 in the range of $A_{c3}$−30° C. to $A_{c3}$+30° C. to form a fully or partially austenitic microstructure, preferably with an average heating rate HR in the range of 5-25° C./s;

Subsequently the strip is kept at T1 for a time period t1 of 10-90 s, followed by slow cooling of the strip with a cooling rate CR1 in the range of 2-12° C./s to a temperature T2 in the range of 570-730° C., preferably 600-730° C.;

Then the strip is rapidly cooled with a cooling rate CR2 in the range of 20-70° C./s to a temperature T3 in the range 380-470° C., preferably 400-450° C., followed by keeping the strip at temperature T4 that is between T3±50° C. for a time period t2 of 25-100 s, wherein T4 at the end of the time period t2 is between T3±30° C., followed by cooling the steel strip at a cooling rate CR3 of at least 4° C./s to a temperature below 300° C.;

The strip is temper rolled with an reduction of less than 0.5%.

The inventors have found that by using this method, a steel strip having the required microstructure can be produced.

According to a third aspect of the invention, a method for producing high strength steel strip according to the first aspect of the invention is provided, comprising the following steps:

The steel with the composition according to the first aspect of the invention is cast and hot rolled to a strip having a thickness of 2.0-4.0 mm and coiled at a coiling temperature (CT) in the range 500-650° C.;

The strip is cold rolled with a reduction of 40-80%;

The strip is heated to a temperature T1 in the range of $A_{c3}$−30° C. to $A_{c3}$+30° C. to form a fully or partially austenitic microstructure, preferably with an average heating rate HR in the range of 5-25° C./s;

Subsequently the strip is kept at T1 for a time period t1 of 10-90 s, followed by slow cooling of the strip with a cooling rate CR1 in the range of 2-12° C./s to a temperature T2 in the range of 570-730° C., preferably 600-730° C.;

Then the strip is rapidly cooled with a cooling rate CR2 in the range of 20-70° C./s to a temperature T3 in the range 380-470° C., preferably 400-450° C., followed by keeping the strip at temperature T4 that is between T3±50 for a time period t2 of 25-100 s, wherein T4 at the end of the time period t2 is between T3±30° C.;

Followed by hot dip coating the steel strip in a galvanizing bath to provide the strip with a zinc coating or a zinc based coating, followed by cooling the coated steel strip at a cooling rate CR3 of at least 4° C./s to a temperature below 300° C.;

The coated strip is temper rolled with an reduction of less than 0.5%.

By using the method in accordance with the third aspect of the invention a galvanised high strength steel sheet is produced. The zinc based coating can for instance contain 0.7-5% Al and/or 0.3-5% Mn.

According to a fourth aspect of the invention, a method for producing high strength steel strip according to the first aspect of the invention is provided, comprising the following steps:

The steel with the composition according to any one of claims 1-13 is cast and hot rolled to a strip having a thickness of 2.0-4.0 mm and coiled at a coiling temperature (CT) in the range 500-650° C.;

The strip is cold rolled with a reduction of 40-80%;

The strip is heated to a temperature T1 in the range of $A_{c3}$−50° C. to $A_{c3}$+40° C. to form a fully or partially austenitic microstructure, preferably with an average heating rate HR in the range of 1-25° C./s;

Subsequently the strip is kept at T1 for a time period t1 of at most 90 s, followed by slow cooling of the strip with a cooling rate CR1 in the range of 0.5-12° C./s to a temperature T2 in the range of 570-730° C., preferably 600-730° C.;

Then the strip is rapidly cooled with a cooling rate CR2 in the range of 5-70° C./s to a temperature T3 in the range 330-470° C., preferably 400-450° C., followed by keeping the strip at temperature T4 that is between T3±50 for a time period t2 of 25-100 s, wherein T4 at the end of the time period t2 is between T3±30° C.;

Optionally followed by hot dip coating the steel strip in a galvanizing bath to provide the strip with a zinc coating or a zinc based coating;

Followed by cooling the coated steel strip at a cooling rate of at least 4° C./s to a temperature below 300° C.;

The coated strip is temper rolled with an reduction of less than 0.5%.

The inventors have found that by using this method according to the fourth aspect of the invention it is possible to produce a steel strip having the required microstructure, wherein the requirements for temperature, time and heating and cooling rate settings are broad.

The invention will be elucidated with reference to the examples below. Nine alloys have been cast using the compositions as given in Table 1 below, the amounts of the elements given in wt. %. Elements not shown in the table are present as impurity.

TABLE 1

| Steel composition (in wt. %) | | | | | | | | |
|---|---|---|---|---|---|---|---|---|
| I/C | Alloy | C | Mn | Si | Cr | Al | S | N | Si + Cr |

| I/C | Alloy | C | Mn | Si | Cr | Al | S | N | Si + Cr |
|---|---|---|---|---|---|---|---|---|---|
| I | A | 0.135 | 2.210 | 0.480 | 0.530 | 0.032 | 0.001 | 0.004 | 1.010 |
| I | B | 0.147 | 2.150 | 0.554 | 0.574 | 0.031 | 0.001 | 0.001 | 1.128 |
| C | C | 0.145 | 2.256 | 0.104 | 0.549 | 0.032 | 0.001 | 0.006 | 0.653 |
| I | D | 0.163 | 2.381 | 0.556 | 0.100 | 0.034 | <0.001 | 0.003 | 0.656 |
| I | E | 0.163 | 2.378 | 0.566 | 0.251 | 0.032 | <0.001 | 0.003 | 0.817 |
| I | F | 0.163 | 2.177 | 0.558 | 0.247 | 0.043 | <0.001 | 0.004 | 0.805 |
| I | G | 0.163 | 2.206 | 0.411 | 0.401 | 0.208 | <0.001 | 0.003 | 0.812 |
| I | H | 0.161 | 2.209 | 0.410 | 0.407 | 0.209 | 0.001 | 0.003 | 0.817 |
| I | I | 0.145 | 2.210 | 0.516 | 0.555 | 0.031 | <0.001 | 0.004 | 1.071 |

| I/C | Alloy | Nb | Mo | Ti | V | P | B | Ca |
|---|---|---|---|---|---|---|---|---|
| I | A | <0.001 | <0.005 | 0.001 | <0.001 | 0.009 | <0.0005 | 0.0005 |
| I | B | <0.001 | 0.002 | 0.001 | 0.003 | 0.001 | <0.0005 | 0.0005 |
| C | C | 0.016 | <0.005 | 0.017 | 0.004 | 0.010 | 0.0001 | 0.0026 |
| I | D | 0.001 | 0.003 | 0.001 | 0.002 | 0.012 | 0.0002 | <0.0005 |
| I | E | 0.001 | 0.003 | 0.001 | 0.002 | 0.012 | 0.0003 | <0.0005 |
| I | F | <0.001 | 0.104 | 0.001 | 0.002 | 0.012 | 0.0001 | <0.0005 |
| I | G | <0.001 | 0.004 | 0.001 | 0.002 | 0.012 | 0.0002 | <0.0005 |
| I | H | 0.019 | 0.003 | 0.001 | 0.002 | 0.012 | 0.0002 | <0.0005 |
| I | I | <0.001 | 0.004 | 0.003 | 0.004 | 0.009 | 0.0004 | 0.0007 |

In Table 1, in the first column I indicates an alloy in accordance with the invention, whereas C indicates an alloy of a comparative example.

The phase transition temperatures of the alloys are given in Table 2. The temperatures above which the microstructure is entirely composed of austenite ($A_{c3}$), bainite start ($B_S$) and martensite start ($M_S$) temperatures (in ° C.) are provided in Table 2:

TABLE 2

| phase transition temperatures | | | | |
|---|---|---|---|---|
| I/C | Alloy | $A_{c3}$ | $B_S$ | $M_s$ |
| I | A | 820 | 554 | 380 |
| I | B | 820 | 549 | 375 |
| C | C | 810 | 575 | 385 |
| I | D | 820 | 547 | 370 |
| I | E | 825 | 544 | 375 |
| I | F | 830 | 551 | 375 |
| I | G | 835 | 556 | 380 |
| I | H | 845 | 557 | 375 |
| I | I | 820 | 550 | 375 |

$A_{c3}$ and $M_S$ temperatures were measured using dilatometry: the sample was heated with an average heating rate 11° C./s till 900° C. Subsequently the sample is kept at 900° C. for 30 s. Then the sample is quenched. $B_S$ temperature was calculated using the JmatPro v10.2 tool.

The method for producing the high strength steel strip according to the examples is as follows.

The cast steel is hot rolled to a thickness of 4.0 mm and coiled at a coiling temperature (CT). The strip is cold rolled with a reduction of 75%. For determination of mechanical properties strip samples were annealed using a laboratory continuous annealing simulator. First the strip is heated with an average heating rate HR to a temperature $T_1$ such that a partly or a fully austenitic microstructure was obtained. Subsequently the strip is kept at $T_1$ for a time period $t_1$. Then the strip is cooled to temperature $T_2$ at a cooling rate $CR_1$, followed by additional cooling to temperature $T_3$ at a cooling rate $CR_2$. Next the strip is held at a temperature $T_4$, in this case equal to $T_3$, during an overaging time $t_2$. During this period the temperature $T_4$ can vary both due to latent heat of transformation that occurs and due to natural cooling. Then the strip is brought to 455° C. which represents the temperature of the Zn bath, which usually is in the range of 450-470° C., and held at this temperature for approximately 17 s to simulate hot dip galvanizing step. Then the strip is cooled down to below 300° C. at a rate of at least 4° C./s. After that the strip is cooled to room temperature in air.

Only Alloy I in example 16 is produced in a factory, where the methods settings differ from those in the laboratory examples, and the produced strip was directly coated with a conventional galvanising The values for cooling rate CT, average heating rate HR, and respective temperatures times and cooling rates used for the production of nine samples are given in Table 3.

TABLE 3 production parameters

| I/C | No | Alloy | CT [° C.] | avg HR [° C./s] | $T_1$ [° C.] | $t_1$ [s] | $CR_1$ [° C./s] | $T_2$ [° C.] | $CR_2$ [° C./s] | $T_3$ [° C.] | $T_4$ [° C.] | $t_2$ [s] |
|---|---|---|---|---|---|---|---|---|---|---|---|---|
| I | 1 | A | 530 | 10 | 840 | 65 | 5 | 650 | 32 | 440 | 440 | 53 |
| I | 2 | A | 530 | 10 | 840 | 65 | 5 | 650 | 35 | 420 | 420 | 53 |
| I | 3 | A | 630 | 10 | 820 | 65 | 3 | 680 | 37 | 440 | 440 | 53 |
| I | 4 | B | 550 | 10 | 825 | 65 | 6 | 600 | 28 | 420 | 420 | 53 |
| I | 5 | B | 550 | 10 | 825 | 65 | 5 | 620 | 31 | 420 | 420 | 53 |
| C | 6 | C | 600 | 10 | 810 | 65 | 5 | 600 | 20 | 470 | 470 | 53 |
| C | 7 | C | 600 | 10 | 810 | 65 | 4 | 650 | 28 | 470 | 470 | 53 |
| I | 8 | D | 620 | 13 | 790 | 65 | 2 | 700 | 43 | 420 | 420 | 53 |
| I | 9 | E | 620 | 13 | 790 | 65 | 2 | 700 | 43 | 420 | 420 | 53 |
| I | 10 | F | 620 | 13 | 830 | 65 | 5 | 620 | 31 | 420 | 420 | 53 |
| I | 11 | F | 620 | 13 | 790 | 65 | 2 | 700 | 43 | 420 | 420 | 53 |
| I | 12 | G | 620 | 13 | 840 | 65 | 5 | 620 | 31 | 420 | 420 | 53 |
| I | 13 | G | 620 | 13 | 800 | 65 | 3 | 700 | 43 | 420 | 420 | 53 |
| I | 14 | H | 620 | 13 | 840 | 65 | 5 | 620 | 31 | 420 | 420 | 53 |
| I | 15 | H | 620 | 13 | 800 | 65 | 3 | 700 | 43 | 420 | 420 | 53 |
| I | 16 | I | 610 | 3 | 850 | 0 | 4 | 670 | 16 | 420 | 420 | 47 |

The microstructure of the produced samples is determined as follows.

The volume fraction of ferrite, bainite and martensite have been evaluated from dilatometry data with the Lever rule (the linear law of mixtures) applied to the data using the non-linear equations for the thermal contraction of bcc and fcc lattices derived in the article by S. M. C. Van Bohemen in Scr. Mater. 69 (2013), p. 315-318 (Ref. [1]). For cooling after full austenitisation, $T_1 > A_{c3}$, the measured thermal contraction in the high temperature range where no transformation occur can be simply described by the expression proposed in Ref. [1] for the fcc lattice. For cooling after partial austenitisation, $T_1 < A_{c3}$, the measured thermal contraction in the high temperature range is determined by the coefficients of thermal expansion (CTE) of the individual phase constituents according to a rule of mixtures. Then the start of transformation during cooling is identified by the first deviation of the dilatometry data from this line defined by the thermal expansion in the high temperature range. Retained austenite (RA) was determined by X-ray diffraction measurements, and the fraction RA has been used as input in the Lever rule analysis of dilatation data.

The volume fractions of ferrite, bainite, martensite and retained austenite (in vol. %) as determined in this way are given in Table 4 for the sixteen samples.

TABLE 4 microstructure

| I/C | No. | Alloy | Ferrite | Bainite | Martensite | Retained austenite |
|---|---|---|---|---|---|---|
| I | 1 | A | 30 | 57 | 4 | 9 |
| I | 2 | A | 22 | 65 | 4 | 9 |
| I | 3 | A | 25 | 64 | 3 | 8 |
| I | 4 | B | 40 | 50 | 4 | 6 |
| I | 5 | B | 38 | 51 | 4 | 7 |
| C | 6 | C | 50 | 32 | 16 | 2 |
| C | 7 | C | 29 | 60 | 10 | 1 |
| I | 8 | D | 66 | 23 | 1 | 10 |
| I | 9 | E | 62 | 24 | 4 | 10 |
| I | 10 | F | 22 | 66 | 2 | 10 |
| I | 11 | F | 63 | 24 | 4 | 9 |
| I | 12 | G | 52 | 37 | 4 | 7 |
| I | 13 | G | 70 | 18 | 3 | 9 |
| I | 14 | H | 63 | 25 | 4 | 8 |
| I | 15 | HJ | 75 | 13 | 3 | 9 |
| I | 16 | I | 50 | 40 | 5 | 5 |

The properties of the samples are determines as follows.

The tensile properties yield strength ($R_p$), tensile strength ($R_m$) and total elongation ($A_{JIS5}$) were determined using a servohydraulic testing machine in a manner in accordance with ISO 6892. Only for Alloy I, example 16 not the total elongation $A_{JIS5}$ was used, but the standard elongation A80.

Hole expansion testing to determine the HEC value was carried out using the testing method describe in ISO 16630 on samples with punched holes, wherein the sample is positioned such that the burr on the punched edges is present on the upper side away from the conical punch.

The properties of the sixteen samples as determined in this way are given in Table 5.

TABLE 5 properties

| I/C | Nr. | Alloy | $R_p$ [MPa] | $R_m$ [MPa] | $A_{JIS5}$ [%] | HEC [%] | ($A_{JIS5}$ × HEC × $R_m$)/$R_p$ |
|---|---|---|---|---|---|---|---|
| I | 1 | A | 570 | 1016 | 14.2 | 27 | 683 |
| I | 2 | A | 598 | 981 | 13.1 | 31 | 664 |
| I | 3 | A | 576 | 995 | 13.5 | 30 | 700 |
| I | 4 | B | 552 | 979 | 15.0 | 27 | 717 |
| I | 5 | B | 540 | 985 | 16.3 | 25 | 743 |
| C | 6 | C | 552 | 993 | 14.6 | 15 | 394 |
| C | 7 | C | 587 | 974 | 12.6 | 21 | 439 |
| I | 8 | D | 479 | 968 | 19.3 | 23 | 898 |
| I | 9 | E | 515 | 1032 | 17.2 | 20 | 688 |
| I | 10 | F | 667 | 1009 | 12.3 | 36 | 667 |
| I | 11 | F | 489 | 1026 | 16.2 | 19 | 644 |
| I | 12 | G | 607 | 973 | 13.4 | 29 | 622 |
| I | 13 | G | 474 | 959 | 17.9 | 21 | 758 |
| I | 14 | H | 502 | 996 | 17.8 | 23 | 812 |
| I | 15 | H | 471 | 1011 | 15.5 | 19 | 631 |
| I | 16 | I | 652 | 963 | 17.3 (A80) | 24 | 588 (based on A80) |

The above examples show that with an alloy in accordance with the invention and with processing steps in accordance with the invention, samples are produced that have the required mechanical properties tensile strength and yield strength, and the required enhanced combination of high total elongation and HEC value.

The inventive alloys and samples also show that with a reasonably low combined amount of silicon and chromium, which can be lower than 1.3 wt. %, high strength steel strip with suitably high properties can be obtained. The combined amount of silicon and chromium can be even lower than 0.85 wt. %, as shown by alloys D to H in Table 1, which alloy can result in a high strength steel type having a total elongation of 12 to 19% and a HEC value of 19 to 36%.

Analysis of the data reveals that the distinction of the inventive examples can be captured by a single requirement namely: $(A_{JIS5} \times HEC \times R_m)/R_p \geq 550$. This expression holds for the present invention with the compositional ranges and process restrictions defined above. See example 7: it has all properties inside of claims ($R_p$, $R_m$, $A_{JIS5}$, HEC); but the formula shows the difference.

The overall formability of the steel can be assessed by this formula. This formula emphasises the importance of optimized properties needed to achieve desired stamping performance: high elongation and high HEC for high tensile strength steel with low yield strength. So it is not only optimization of high elongation or high hole expansion capacity, but both together.

The invention claimed is:

1. A high strength steel strip having a composition consisting of the following elements, in wt. %:
C 0.12-0.18
Mn 2.00-2.60
Si 0.30-0.77
Cr 0.10-0.70
Al<0.39
S<0.005
N<0.015
P<0.03
and optionally one or more of the elements selected from:
Nb<0.06
Mo<0.20
Ti<0.04
V<0.20
B<0.004
Ca<0.004
the remainder being iron and unavoidable impurities,
wherein the steel strip has a microstructure consisting of, in vol. %:
  ferrite and bainite together 50-90, wherein ferrite is 15-55 and bainite is 35-75,
  martensite<15,
  retained austenite 5-15,
  the remainder being pearlite, cementite, precipitates and inclusions together up to 5,
the sum adding up to 100 vol. %,
  wherein the steel strip has a hole expansion capacity (HEC)>15%.

2. The high strength steel strip according to claim 1, wherein the microstructure, in vol. %, is characterized by one or more of the following:
martensite<10,
retained austenite 5-10.

3. The high strength steel strip according to claim 1, wherein the amount of C is 0.13-0.18 (in wt. %), and/or wherein the amount of Mn is 2.00-2.50 (in wt. %).

4. The high strength steel strip according to claim 1, wherein the amount of Si+Cr≤1.30 (in wt. %).

5. The high strength steel strip according to claim 1, wherein the amount of Si is 0.30-0.70 (in wt. %), and/or wherein the amount of Cr is 0.15-0.65 (in wt. %), and/or wherein the amount of Al is <0.10 (in wt. %).

6. The high strength steel strip according to claim 1, wherein the amount of Nb is <0.04 (in wt. %), and/or wherein the amount of Ti is <0.03 (in wt. %).

7. The high strength steel strip according to claim 1, wherein the amount of B is <0.002 (in wt. %), and/or wherein the amount of V is <0.10 (in wt. %), and/or wherein the amount of Mo is <0.10 (in wt. %).

8. The high strength steel strip according to claim 1, wherein one or more of Nb, Mo, Ti, V and B is present as an impurity.

9. The high strength steel strip according to claim 1, wherein the steel strip has one or more of the following properties:
tensile strength ($R_m$) in the range of 950-1200 MPa,
yield strength ($R_p$)≤620 MPa before temper rolling,
total elongation ($A_{JIS5}$)>12%.

10. The high strength steel strip according to claim 1, wherein the steel strip has a total elongation ($A_{JIS5}$)>13%.

11. The high strength steel strip according to claim 1, wherein the hole expansion capacity (HEC) is >20%.

12. The high strength steel strip according to claim 9, wherein the following condition applies: $(A_{JIS5} \times HEC \times R_m)/R_p \geq 550$.

13. The high strength steel strip according to claim 1, wherein the steel strip is coated with a zinc based coating, the coated strip having a yield strength $R_p$≤740 MPa after temper rolling.

14. A method for producing high strength steel strip according to claim 1, comprising the following steps:
the steel with the composition of claim 1 is cast and hot rolled to a strip having a thickness of 2.0-4.0 mm and coiled at a coiling temperature (CT) in the range 500-650° C.;
the strip is cold rolled with a reduction of 40-80%;
the strip is heated to a temperature T1 in the range of $A_{c3}$−30° C. to $A_{c3}$+30° C. to form a fully or partially austenitic microstructure;
subsequently the strip is kept at T1 for a time period t1 of 10-90 s, followed by slow cooling of the strip with a cooling rate CR1 in the range of 2-12° C./s to a temperature T2 in the range of 570-730° C.;
then the strip is rapidly cooled with a cooling rate CR2 in the range of 20-70° C./s to a temperature T3 in the range 380-470° C., followed by keeping the strip at temperature T4 that is between T3±50° C. for a time period t2 of 25-100 s, wherein T4 at the end of the time period t2 is between T3±30° C., followed by cooling the steel strip at a cooling rate CR3 of at least 4° C./s to a temperature below 300° C.;
the coated strip is temper rolled with a reduction of less than 0.5%.

15. A method for producing high strength steel strip according to claim 1, comprising the following steps:
the steel with the composition according to claim 1 is cast and hot rolled to a strip having a thickness of 2.0-4.0 mm and coiled at a coiling temperature (CT) in the range 500-650° C.;
the strip is cold rolled with a reduction of 40-80%;
the strip is heated to a temperature T1 in the range of $A_{c3}$−30° C. to $A_{c3}$+30° C. to form a fully or partially austenitic microstructure;
subsequently the strip is kept at T1 for a time period t1 of 10-90 s, followed by slow cooling of the strip with a cooling rate CR1 in the range of 2-12° C./s to a temperature T2 in the range of 570-730° C.;
then the strip is rapidly cooled with a cooling rate CR2 in the range of 20-70° C./s to a temperature T3 in the range 380-470° C., followed by keeping the strip at temperature T4 that is between T3±50° C. for a time period t2 of 25-100 s, wherein T4 at the end of the time period t2 is between T3±30° C.;

followed by hot dip coating the steel strip in a galvanizing bath to provide the strip with a zinc coating or a zinc based coating, followed by cooling the coated steel strip at a cooling rate of at least 4° C./s to a temperature below 300° C.;

the coated strip is temper rolled with a reduction of less than 0.5%.

16. A method for producing high strength steel strip according to claim 1, comprising the following steps:

the steel with the composition according to claim 1 is cast and hot rolled to a strip having a thickness of 2.0-4.0 mm and coiled at a coiling temperature (CT) in the range 500-650° C.;

the strip is cold rolled with a reduction of 40-80%;

the strip is heated to a temperature T1 in the range of $A_{c3}$−50° C. to $A_{c3}$+40° C. to form a fully or partially austenitic microstructure;

subsequently the strip is kept at T1 for a time period t1 of at most 90 s, followed by slow cooling of the strip with a cooling rate CR1 in the range of 0.5-12° C./s to a temperature T2 in the range of 570-730° C.;

then the strip is rapidly cooled with a cooling rate CR2 in the range of 5-70° C./s to a temperature T3 in the range 330-470° C., followed by keeping the strip at temperature T4 that is between T3±50° C. for a time period t2 of 25-100 s, wherein T4 at the end of the time period t2 is between T3±30° C.;

optionally followed by hot dip coating the steel strip in a galvanizing bath to provide the strip with a zinc coating or a zinc based coating;

followed by cooling the coated steel strip at a cooling rate of at least 4° C./s to a temperature below 300° C.;

the coated strip is temper rolled with a reduction of less than 0.5%.

17. The high strength steel strip according to claim 1, wherein the martensite is 1-5 vol. % of the microstructure.

18. The high strength steel strip according to claim 1, wherein the amount of C is 0.12-0.163 (in wt. %).

19. The high strength steel strip according to claim 1, wherein the amount of Si+Cr≤1.20 (in wt. %).

20. The high strength steel strip according to claim 1, wherein the amount of Si is 0.35-0.65 (in wt. %), and/or wherein the amount of Cr is 0.20-0.60 (in wt. %), and/or wherein the amount of Al is <0.05 (in wt. %).

21. The high strength steel strip according to claim 1, wherein the amount of Nb is <0.03 (in wt. %), and/or wherein the amount of Ti is <0.020 (in wt. %).

22. The high strength steel strip according to claim 1, wherein the amount of B is <0.001 (in wt. %), and/or wherein the amount of V is <0.05 (in wt. %), and/or wherein the amount of Mo is <0.05 (in wt. %).

23. The high strength steel strip according to claim 1, wherein the steel strip has one or more of the following properties:

tensile strength ($R_m$) in the range of 980-1180 MPa, yield strength ($R_p$)≤600 MPa before temper rolling, total elongation ($A_{JIS5}$)>12%.

24. The high strength steel strip according to claim 1, wherein the steel strip has a total elongation (AJIS5)>14%.

25. The high strength steel strip according to claim 1, wherein the hole expansion capacity (HEC) is >25%.

26. The high strength steel strip according to claim 9, wherein the following condition applies: (AJIS5×HEC×$R_m$)/$R_p$≥600.

27. The high strength steel strip according to claim 1, wherein the steel strip is coated with a zinc based coating, the coated strip having a yield strength $R_p$≤720 MPa after temper rolling.

* * * * *